UNITED STATES PATENT OFFICE 2,409,756

METHOD FOR OBTAINING 5,5-DIARYL-HYDANTOINS

Henry R. Henze, Austin, Tex., assignor to Parke, Davis & Company, Detroit, Mich., a corporation of Michigan No Drawing. Original application September 9, 1940, Serial No. 356,107. Divided and this application May 11, 1944, Serial No. 535,212

13 Claims. (Cl. 260—309.5)

This invention relates to a method for obtaining hydantoins from ketones and more particularly to the preparation of 5,5-diarylhydantoins from diaryl ketones.

This application is a division of my copending application Serial No. 356,107, filed September 9, 1940.

An object of this invention is the preparation of diarylhydantoins from diaryl ketones according to a new and novel method.

Other objects of this invention will be apparent on perusal of the specification and the appended claims.

Hitherto diarylhydantoins have been prepared from derivatives of benzil and similar compounds. However, no method has been available for the preparation of 5,5-diarylhydantoins from the corresponding diaryl ketones, despite the fact that such ketones are frequently more readily available than the corresponding benzil derivatives.

I have found that 5,5-diarylhydantoins can be prepared from diaryl ketones by heating the latter, in the presence of a glycol, such as propylene glycol, with a water soluble cyanide and ammonium carbonate or an equivalent substance capable of yielding ammonia and carbon dioxide under the conditions of reaction. The reaction mixture thus obtained is treated so as to remove any unreacted diaryl ketone and then the hydantoin is isolated, for example, by acidifying the alkaline solution.

The reaction may be illustrated as follows for the case of the preparation of 5,5-diphenyl-hydantoin:

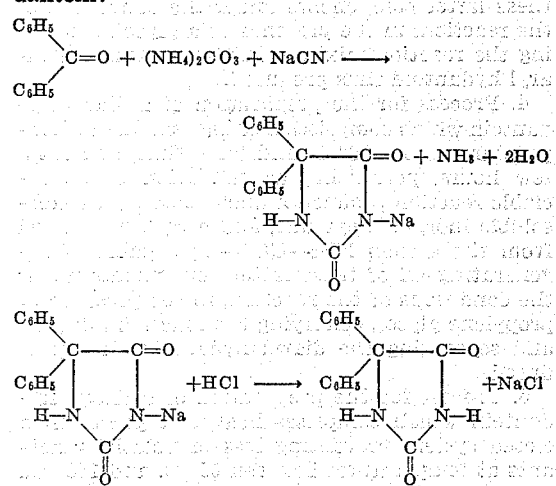

I have also found that the conditions of reaction required for the formation of diarylhydantoins from diaryl ketones determine the yield which may be obtained. In general, the operating temperature should be maintained within the range of 50–150° C. and the time required for reaction proportionately varied from at least 20 hours for the lower temperatures to at least 1 hour for the higher temperatures, although longer times of heating are in general helpful. At the lower temperatures longer times of heating are required to obtain the same gross yield that may be obtained at higher temperatures with shorter reaction times. For example, while at least 20 hours of heating at 55° is necessary to get a substantial yield, the same yield can be obtained at 110° by only a few hours of heating in a closed vessel so as to retain the volatile components.

In general, the diaryl ketone is not completely converted into the diarylhydantoin. The yield of diarylhydantoin calculated on the basis of the amount of diaryl ketone originally introduced into the reaction mixture is termed the gross yield while the yield of diarylhydantoin calculated on the basis of the amount of diaryl ketone actually used up, i. e. the difference between the amount of diaryl ketone originally introduced and the amount recovered, is termed the net yield. While the gross yield is considerably diminished by operating at lower temperatures and for shorter times of heating, the net yield is good under all conditions within the range indicated.

*Example.—Preparation of 5,5-diphenylhydantoin using propylene glycol as a solvent*

To a solution of 91 grams of benzophenone in 500 cc. of propylene glycol is added 50 cc. of water, 45 grams of potassium cyanide and 145 grams of ammonium carbonate. The mixture is heated in a steel bomb at 110° C. for 6 hours. At the end of this time the mixture is concentrated under reduced pressure to a paste. This paste is diluted with water and acidified with hydrochloric acid. The precipitate is collected and leached with 5% sodium hydroxide solution. The undissolved ketone is separated and the alkaline solution acidified with dilute hydrochloric acid. The precipitated 5,5-diphenylhydantoin is collected and dried. Thus there is obtained a 91% gross yield of the hydantoin; since about 6 grams of benzophenone is recovered, the net yield is 97.5%.

Instead of using propylene glycol in this example, other glycol solvents may be employed such as ethylene glycol, the mono ethyl ether of ethylene glycol, the mono methyl ether of ethylene glycol, glycerol and the like.

The effect of variations in this preparation is shown by the following table:

| Expt. No. | Reactants | Solvent | Conditions | Gross yield | Net yield |
|---|---|---|---|---|---|
| | | | | Percent | |
| 1 | 9.1 g. benzophenone, 5.0 g. potassium cyanide, 15 g. ammonium carbonate. | 100 cc. propylene glycol | 110° C.; 11 hrs | 91.4 | |
| 2 | ...do... | 100 cc. propylene glycol, 25 cc. water | 110° C.; 10.5 hrs | 95.3 | |
| 3 | ...do... | 50 cc. propylene glycol, 5 cc. water | 110° C.; 5.5 hrs | 95.3 | |
| 4 | ...do... | ...do... | 110° C.; 4 hrs | 83.5 | |
| 5 | 9.1 g. benzophenone, 3.57 g. potassium cyanide, 9.6 g. ammonium carbonate. | 50 cc. propylene glycol, 4 cc. water | ...do... | 60.3 | |
| 6 | 91 g. benzophenone, 45 g. potassium cyanide, 145 g. ammonium carbonate. | 500 cc. propylene glycol, 50 cc. water | 110° C.; 6 hrs | 91.2 | 97.5 |
| 7 | 9.1 g. benzophenone, 4.5 g. potassium cyanide, 15 g. ammonium carbonate. | 80 cc. ethylene glycol | 110° C.; 10 hrs | 41.2 | |
| 8 | 9.1 g. benzophenone, 4.5 g. potassium cyanide, 15.0 g. ammonium carbonate. | 100 cc. water | 110° C.; 14 hrs | 0 | |

Instead of using benzophenone, I may employ any diaryl ketone containing in the aromatic nucleus no groups which are attacked by cyanides or ammonium carbonate or the combination of the two. Thus I may practice my invention on ring-halogenated diaryl ketones, on ring-amino substituted diaryl ketones, ring-alkylated diaryl ketones and the like. Such ketones include p-bromobenzophenone, p-aminobenzophenone, xenyl phenyl ketone, di-p-tolyl ketone, anisyl phenyl ketone, etc.

Instead of using sodium cyanide or potassium cyanide in the practice of my invention, I may employ other water-soluble cyanides such as calcium cyanide or lithium cyanide. However, I usually prefer to use alkali metal cyanides, because of their availability.

Instead of using ammonium carbonate in the practice of my invention, I may use other equivalent sources of carbon dioxide and ammonia. For example, ammonia gas and carbon dioxide gas may be pumped into the autoclave containing the mixture of the diaryl ketone, the organic solvent and the water-soluble cyanide, and the mixture heated and worked up to obtain the corresponding diarylhydantoin. Another source of ammonia and carbon dioxide is ammonium carbamate.

Where in the specification and claims the term ammonium carbonate is used, it is to be understood that it refers to the article of commerce designated by that name, which however is considered to be in reality a mixture of ammonium bicarbonate and ammonium carbamate. See further F. Ephraim, Inorganic Chemistry (third ed., translated by P. C. L. Thorne and A. M. Ward, Nordeman Publishing Company, New York, 1939), page 801.

Since the invention may be practiced not only with ammonium carbonate, as above defined, but also with other equivalent sources of carbon dioxide and ammonia in the presence of water, I have used as a generic expression the phrase "reagent derived from the system $NH_3$—$CO_2$—Aq capable of regenerating all of these components under the conditions of reaction."

While the condensation of the diaryl ketone, the cyanide and ammonium carbonate proceeds in satisfactory yields when the mixture is heated in an open vessel at 50–65° C. for a long period of time, when higher temperatures are employed as for example from 65–150° C., there is a considerable loss of volatile reactants if an open vessel is employed. Accordingly, when operating in the range 65–150° C., I prefer to operate in a closed vessel.

Because of these permissible variations in my process, I do not wish my invention to be limited to a specific embodiment but desire rather that it be construed as broadly as possible in view of the prior art and the appended claims.

What I claim as my invention is:

1. Process for the preparation of a diaryl hydantoin which comprises heating together at temperatures above 50° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of a glycol, acidifying the reaction mixture, and separating the diaryl hydantoin thus produced.

2. Process for the preparation of a diaryl hydantoin which comprises heating together in a closed system preventing loss of volatile reactants at temperatures above 50° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of a glycol, acidifying the reaction mixture, and separating the diaryl hydantoin thus produced.

3. Process for the preparation of a diaryl hydantoin which comprises heating together in a closed system preventing loss of volatile reactants at temperatures between 65° C. and 150° C., and for a time, at least four hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of a glycol, acidifying the reaction mixture, and separating the diaryl hydantoin thus produced.

4. Process for the preparation of a diaryl hydantoin which comprises heating together at temperatures above 50° C. and for a time, at least a few hours, permitting accumulation of appreciable reaction product, a diaryl ketone, a water-soluble inorganic cyanide, and a reagent derived from the system $NH_3$—$CO_2$—Aq capable of regenerating all of these latter components under the conditions of the reaction, in the presence of propylene glycol, acidifying the reaction mixture, and separating the diaryl hydantoin thus produced.

5. Process for the preparation of a diaryl hydantoin which comprises heating together in a closed system preventing loss of volatile reactants at temperatures between 65° C. and 150° C., and for a time, at least four hours, permitting accumulation of appreciable reaction product, a diaryl ketone, a water-soluble inorganic cyanide, and a reagent derived from the system $$NH_3\text{---}CO_2\text{---}Aq$$

capable of regenerating all of these latter components under the conditions of the reaction, in the presence of propylene glycol, acidifying the reaction mixture, and separating the diaryl hydantoin thus produced.

6. Process for the preparation of a diaryl hydantoin which comprises heating together at temperatures above 50° C. and for a time, at least a few hours, permitting accumulation of appreciable reaction product, a diaryl ketone, a water-soluble inorganic cyanide, and a reagent derived from the system $NH_3\text{---}CO_2\text{---}Aq$ capable of regenerating all of these latter components under the conditions of the reaction, in the presence of ethylene glycol, acidifying the reaction mixture, and separating the diaryl hydantoin thus produced.

7. Process for the preparation of a diaryl hydantoin which comprises heating together in a closed system preventing loss of volatile reactants at temperatures between 65° C. and 150° C., and for a time, at least four hours, permitting accumulation of appreciable reaction product, a diaryl ketone, a water-soluble inorganic cyanide and a reagent derived from the system $NH_3\text{---}CO_2\text{---}Aq$ capable of regenerating all of these latter components under the conditions of the reaction, in the presence of ethylene glycol, acidifying the reaction mixture, and separating the diaryl hydantoin thus produced.

8. Process for the preparation of 5,5-diphenyl hydantoin which comprises heating together at temperatures above 50° C. and for a time, at least a few hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of a glycol, acidifying the reaction mixture, and separating the 5,5-diphenyl hydantoin thus produced.

9. Process for the preparation of 5,5-diphenyl hydantoin which comprises heating together in a closed system preventing loss of volatile reactants at temperatures between 65° C. and 150° C., and for a time, at least four hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of a glycol, acidifying the reaction mixture, and separating the 5,5-diphenyl hydantoin thus produced.

10. Process for the preparation of 5,5-diphenyl hydantoin which comprises heating together at temperatures above 50° C. and for a time, at least a few hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of propylene glycol, acidifying the reaction mixture, and separating the 5,5-diphenyl hydantoin thus produced.

11. Process for the preparation of 5,5-diphenyl hydantoin which comprises heating together in a closed system preventing loss of volatile reactants at temperatures between 65° C. and 150° C., and for a time, at least four hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of propylene glycol, acidifying the reaction mixture, and separating the 5,5-diphenyl hydantoin thus produced.

12. Process for the preparation of 5,5-diphenyl hydantoin which comprises heating together at temperatures above 50° C. and for a time, at least a few hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of ethylene glycol, acidifying the reaction mixture, and separating the 5,5-diphenyl hydantoin thus produced.

13. Process for the preparation of 5,5-diphenyl hydantoin which comprises heating together in a closed system preventing loss of volatile reactants at temperatures between 65° C. and 150° C., and for a time, at least four hours, permitting accumulation of appreciable reaction product, benzophenone, a water-soluble inorganic cyanide, and a reagent derived from the system $NH_3\text{---}CO_2\text{---}Aq$ capable of regenerating all of these latter components under the conditions of the reaction, in the presence of ethylene glycol, acidifying the reaction mixture, and separating the 5,5-diphenyl hydantoin thus produced.

HENRY R. HENZE.